United States Patent
Kaippilly et al.

(10) Patent No.: US 11,659,047 B2
(45) Date of Patent: May 23, 2023

(54) METHOD AND APPARATUS FOR MANAGEMENT OF A NETWORK CONFIGURATION SESSION

(71) Applicant: ARRIS Enterprises LLC, Suwanee, GA (US)

(72) Inventors: Bijoy R. Kaippilly, Bengalore (IN); Manjunath Ramachandra, Bangalore (IN); Yogesh Sasidharan Nair, Bangalore (IN); Namitha P. Shenoy, Bangalore (IN); Adarsh Telkur, Karnataka (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/465,963

(22) Filed: Sep. 3, 2021

(65) Prior Publication Data
US 2022/0094750 A1    Mar. 24, 2022

Related U.S. Application Data (60) Provisional application No. 63/080,886, filed on Sep. 21, 2020.

(51) Int. Cl.
*G06F 15/16* (2006.01)
*H04L 67/145* (2022.01)
*H04L 41/0803* (2022.01)

(52) U.S. Cl.
CPC ........ *H04L 67/145* (2013.01); *H04L 41/0803* (2013.01)

(58) Field of Classification Search
CPC .......................... H04L 67/145; H04L 41/0803

USPC ................................. 709/220–221, 227–228
See application file for complete search history.

(56) References Cited

U.S. PATENT DOCUMENTS

| | | | |
|---|---|---|---|
| 9,537,716 B1* | 1/2017 | Earl | ................... H04L 41/0856 |
| 10,298,588 B2* | 5/2019 | Pawl | ..................... H04L 63/101 |
| 2005/0193103 A1* | 9/2005 | Drabik | ............... H04L 63/0272 |
| | | | 709/221 |

(Continued)

FOREIGN PATENT DOCUMENTS

EP    2 153 648 B1    1/2014

OTHER PUBLICATIONS

Notification of Transmittal of the International Search Report (Forms PCT/ISA/220 and PCT/ISA/210) and the Written Dpinion of the International Searching Authority (Form PCT/ISA/237) dated Dec. 20, 2021, by the International Application Division Korean Intellectual Property Office in corresponding International Application No. PCT/US2021/048956. (10 pages).

*Primary Examiner* — Bharat Barot
(74) *Attorney, Agent, or Firm* — Panitch Schwarze Belisario & Nadel LLC (57) ABSTRACT

Methods and apparatus for managing configuration sessions on remotely configurable network components, and a non-transitory computer readable medium for managing configuration sessions on such components. The method includes configuring a remote configuration interface to transmit a heartbeat signal or keep alive message within a defined interval while the remote configuration interface remains operational and closing a remote configuration session on a remotely configurable network component if a heartbeat signal or keep alive message is not received within a period corresponding to the defined interval.

18 Claims, 5 Drawing Sheets

(56) References Cited

U.S. PATENT DOCUMENTS

| | | | |
|---|---|---|---|
| 2007/0104161 A1 | 5/2007 | Hossain et al. | |
| 2011/0246595 A1* | 10/2011 | Undery | H04L 67/145 709/207 |
| 2015/0006614 A1* | 1/2015 | Suryanarayanan | H04L 67/145 709/203 |
| 2019/0116183 A1 | 4/2019 | Hussain et al. | |
| 2019/0379768 A1 | 12/2019 | Amicangioli et al. | |

* cited by examiner

METHOD AND APPARATUS FOR MANAGEMENT OF A NETWORK CONFIGURATION SESSION

TECHNICAL FIELD

The present disclosure generally relates to a method and apparatus for managing a session connection between a configuration interface system and a device configuration system in a network.

BACKGROUND

Communication components in a network, such as routers, modems, network interface devices, optical line terminals, optical network terminals, wireless access points, radio base stations, and mobile receivers among other devices, are typically configurable to operate within a specific network environment according to the network requirements and/or the preferences and policies of users and network operators. Typically, configurable settings for controlling the operation of a device, operation of the network, and processing of the communication signals of each component may be changed by accessing a device configuration system within each component.

In some implementations, a configuration interface of a component may be accessible remotely over the network. A configuration session may be established between a remote component that provides a remote configuration interface for changing one or more configurable settings of a communication component of the network. While a configuration session is established, the communication component that is being configured may block the establishment of another configuration session, e.g., a second or subsequent configuration session or a configuration session originating from another device. However, if an established session is inadvertently interrupted, this can prevent the reestablishment of a configuration session to the device or the establishment of a session from another remote component. Consequently, it would be desirable to provide an improved way of managing remote configuration sessions in a network.

SUMMARY

In accordance with exemplary embodiments described herein, a method and apparatus are disclosed that provides a signal from a remote component providing a remote configuration interface that has established a configuration session with a remotely configurable network component to indicate that the established configuration session remains active and should be maintained.

For example, a remote communication component that provides a remote configuration interface for a remotely configurable network communications component can be configured to transmit a regular or irregular "heartbeat" signal or "keep alive" message, which may or may not include additional data regarding the status of the remote component, remote configuration interface, the remote component's connection to the network, the time that the signal was transmitted, and/or other data. In an embodiment of a regular signal, a "heartbeat" signal or "keep alive" message may be transmitted at defined intervals without regard to whether a user has caused the remote configuration interface to transmit configuration data to the remotely configurable network communications component within the period of a defined interval. In an example of an irregular signal, "heartbeat" signal or "keep alive" message could be transmitted only where a user has not caused the remote configuration interface to transmit configuration data to the remotely configurable network communications component within the period of a defined interval. The signal is not transmitted when a user has closed the remote configuration interface, whether intentionally or unintentionally, or when the remote configuration interface becomes unusable, for example if the component hosting the remote configuration interface experiences a critical error.

In accordance with exemplary embodiments, a remotely configurable network communications component may be configured to receive a "heartbeat" signal or "keep alive" message from a remote component and to measure an amount of time since the last signal was received from the remote component.

In accordance with exemplary embodiments, a remotely configurable network communications component may be configured to act in response to a "heartbeat" signal or "keep alive" message, by, for example, resetting a timer, e.g., a countdown timer or a count-up timer. Where a countdown timer is used, a remotely configurable network communications component may be configured to, upon expiration of the countdown, close the configuration session, release any block on the establishment of a new session, and optionally take any other actions consistent with the unexpected termination of a configuration session. Where a count-up timer is used, a remotely configurable network communications component may be configured to, after the timer reaches a defined time limit, close the configuration session and release any block on the establishment of a new session, and optionally take any other actions consistent with the unexpected termination of a configuration session.

In accordance with exemplary embodiments, a remotely configurable network communications component may be configured to provide instructions and data to a remote device to provide a configuration interface on the remote device and to transmit a regular or irregular "heartbeat" signal or "keep alive" message while the configuration interface is operational and connected to a configuration session. For example, a remotely configurable network communications component could provide instructions and data to a remote component for the display of a graphical user interface configured to, among other things, display the current configurable settings, optionally in conjunction with displaying data regarding the status of the remotely configurable network communications component, and permit the user, or a network operator or other technician, to change the configurable settings.

In an alternative embodiment, a remote device may be provided, comprising instructions for initiating a configuration session on a remotely configurable network communications component and then providing a user interface configured to, among other things, display the current configurable settings of, optionally in conjunction with displaying data regarding the status of the remotely configurable network communications component, and permit the user, or a network operator or other technician, to change the configurable settings and to transmit a regular or irregular "heartbeat" signal or "keep alive" message while the configuration interface is operational and connected to a configuration session. A user interface is preferably, but not necessarily, a graphical user interface.

Accordingly, in one aspect, a method for managing a remote configuration session in a remotely configurable network component is disclosed, the method comprising:

establishing, by a remotely configurable network component in communication with a remote device, a remote configuration session, wherein the remotely configurable network component;

blocking, by a remotely configurable network component, establishment of a second or subsequent remote configuration session while a first session is established;

receiving, in the remotely configurable network component, a heartbeat signal transmitted by the remote device, wherein the remote device is configured to transmit a heartbeat signal to the remotely configurable network component while a configuration interface is open and operably connected to a remote configuration session on a remotely configurable network component whether or not a user is interacting with the configuration interface;

measuring, by a heartbeat timer in the remotely configurable network component, a time since the heartbeat signal was received by the remotely configurable network component;

restarting, by the remotely configurable network component, the timer if the heartbeat signal was received by the remotely configurable network component within a defined heartbeat period;

closing the remote configuration session, by the remotely configurable network component, if the heartbeat signal was not received by the remotely configurable network component within the defined period; and unblocking, by the remotely configurable network component, establishment of a second or subsequent remote configuration session when the first session is closed.

In another aspect, the method can comprise:

measuring, by a user inactivity timer in the remotely configurable network component, a time since a signal of user activity was received from the remote device by the remotely configurable network component;

restarting, by the remotely configurable network component, the user-inactivity timer if the heartbeat signal was received by the remotely configurable network component within a defined user-inactivity period; and closing the remote configuration session, by the remotely configurable network component, if a user initiated signal was not received by the remotely configurable network component within the defined user-inactivity period.

In another aspect, the defined heartbeat period is preferably shorter than the defined user-inactivity period.

In another aspect, the heartbeat signal can be a keep-alive message comprising data relating to the timing of the heartbeat message, a status of the remote device, a status of the network, and/or other data.

In another aspect, the method can further comprise: changing, on the remotely configurable network component, one or more configurable settings in response to user input to the configuration interface.

In another aspect, the method can further comprise: closing the remote configuration session, by the remotely configurable network component, if a user logs out of the configuration interface.

In accordance with another aspect, a customer-premises remotely configurable network device is disclosed comprising: a network interface configured to, in response to a request from a remote device, provide instructions and data to provide a configuration interface on the remote device and instruct the remote device to transmit a regular or irregular "heartbeat" signal or "keep alive" message while the configuration interface is operational and connected to a configuration session.

In accordance with another aspect, a remotely configurable network component can comprise a configuration system operable to communicate with a remote device to establish a configuration session and to receive instructions from a configuration interface on the remote device to change one or more configurable settings and to receive a heartbeat signal from the configuration interface on the remote device, wherein the configuration system is configured to block establishment of a second or subsequent configuration session while a first configuration session is open, the configuration system comprising a heartbeat timer that measures a time since a heartbeat signal has been received from the configuration interface on the remote device, wherein the configuration system is configured to close the configuration session if a heartbeat signal is not received within a defined heartbeat period.

In accordance with another aspect, a remotely configurable network component can further comprise a user-activity timer that measures a time since a user-activity signal has been received from the configuration interface on the remote device, wherein the configuration system is configured to close the configuration session if a user-activity signal is not received within a defined user-inactivity period. The defined heartbeat period is preferably shorter than the defined user-inactivity period.

In accordance with another aspect, the heartbeat signal can be a keep-alive message comprising data relating to the timing of the heartbeat message, a status of the remote device, a status of the network, and/or other data.

In accordance with another aspect, the remotely configurable network component can further comprise instructions that can be communicated to a remote device for providing a configuration interface using HTTP or HTTPS in a web browser on the remote device, wherein the instructions include instructions that cause the configuration interface on the remote device to transmit a heartbeat signal at a defined heartbeat interval while the configuration interface is open and operable.

In accordance with another aspect, the configuration system can be configured to close the remote configuration session, in the remotely configurable network component, if a user logs out of the configuration interface.

In accordance with another aspect, the remotely configurable network component can be a customer premises equipment device, for example a cable modem or a DOCSIS gateway. Alternatively, the remotely configurable network component can be a router.

In accordance with an aspect, a non-transitory computer readable medium is disclosed having instructions operable to cause one or more processors to perform operations comprising, in response to a request from a remote device, providing instructions and data to the remote device to provide a configuration interface on the remote device and instructing the remote device to transmit a regular or irregular "heartbeat" signal or "keep alive" message while the configuration interface is operational and connected to a configuration session.

Accordingly, in one aspect, a non-transitory computer readable medium is disclosed having instructions operable to cause one or more processors to perform operations comprising:

establishing, by a remotely configurable network component in communication with a remote device, a remote configuration session, wherein the remotely configurable network component;

blocking, by a remotely configurable network component, establishment of a second or subsequent remote configuration session while a first session is established;

receiving, in the remotely configurable network component, a heartbeat signal transmitted by the remote device, wherein the remote device is configured to transmit a heartbeat signal to the remotely configurable network component while a configuration interface is open and operably connected to a remote configuration session on a remotely configurable network component whether or not a user is interacting with the configuration interface;

measuring, by a heartbeat timer in the remotely configurable network component, a time since the heartbeat signal was received by the remotely configurable network component;

restarting, by the remotely configurable network component, the timer if the heartbeat signal was received by the remotely configurable network component within a defined heartbeat period;

closing the remote configuration session, by the remotely configurable network component, if the heartbeat signal was not received by the remotely configurable network component within the defined period; and unblocking, by the remotely configurable network component, establishment of a second or subsequent remote configuration session when the first session is closed.

In another aspect, the instructions can be further operable to cause one or more processors to perform operations comprising:

measuring, by a user inactivity timer in the remotely configurable network component, a time since a signal of user activity was received from the remote device by the remotely configurable network component;

restarting, by the remotely configurable network component, the user-inactivity timer if the heartbeat signal was received by the remotely configurable network component within a defined user-inactivity period; and closing the remote configuration session, by the remotely configurable network component, if a user initiated signal was not received by the remotely configurable network component within the defined user-inactivity period.

In another aspect, the instructions can be further operable to cause one or more processors to perform operations wherein the defined heartbeat period is shorter than the defined user-inactivity period.

In another aspect, the instructions can be further operable to cause one or more processors to perform operations wherein the heartbeat signal is a keep-alive message comprising data relating to the timing of the heartbeat message, a status of the remote device, a status of the network, and/or other data.

In another aspect, the instructions can be further operable to cause one or more processors to perform operations comprising changing, on the remotely configurable network component, one or more configurable settings in response to user input to the configuration interface.

In another aspect, the instructions can be further operable to cause one or more processors to perform operations comprising closing the remote configuration session, by the remotely configurable network component, if a user logs out of the configuration interface.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

The inventors have improved the operation of remotely configured network components by implementing a method of managing configuration sessions established between a remote device and a remotely configured network component. The improvement comprises including a heartbeat timer (for example as a second timer in addition to a longer user-inactivity timer) in a remotely configurable network component, and configuring a remote device to transmit a heartbeat signal (or keep-alive message) at an interval shorter than the period of the heartbeat timer. The heartbeat signal is transmitted so long as a configuration interface on the remote device is connected to the remotely configurable network component and is operable, whether or not a user is actively interacting with the configuration interface. If the heartbeat signal stops and a heartbeat signal is not received in the remotely configurable network component within the period of the heartbeat timer, then the remotely configurable network component can close an open configuration session and permit the establishment of a subsequent session. In this way, a gateway can react appropriately and in a timely manner if a graphical user interface to a configuration session stops functioning, a connection is interrupted, or the interface is inadvertently closed by a user without logging out. In such an event, it is not necessary to wait for the expiration of a longer user-inactivity timer before establishing a new configuration session.

In an exemplary embodiment, the disclosure can be illustrated with regard to a cable internet Data Over Cable Service Interface Specification (DOCSIS) modem or gateway. A person of ordinary skill in the art will immediately recognize that the disclosure can be similarly implemented in any remotely configurable network component.

Cable service providers, which are also referred to as Multiple System Operators ("MSO"), or any communication or content distribution business that operates through a cable network, renders its services to its subscribers. In order to consume these services, subscribers connect to a private network owned (or co-owned or rented) by the broadband cable operator which is implemented according to the DOCSIS standard. To provide television and data services, a MSO typically uses a Cable Modem Termination System ("CMTS") for the data services and a quadrature amplitude modulation ("QAM") multiplexer for downstream broadcast television, narrow cast and video-on-demand (VoD) traffic signals. These devices may be located at one or more hubs, which are typically connected to a head end via a network according to a networking protocol, such as Ethernet or SONET. A residential cable customer is typically connected to the CMTS and hub via a cable modem, which may optionally comprise a wireless router combined in a single box that is called a gateway. A cable modem thus typically provides a connection to the cable network (i.e., a wide-area network (WAN)) and one or more wired and/or wireless connections to the network with a customer's home or business (i.e., a local-area network (LAN)).

A cable modem or gateway typically has one or more remotely configurable settings. The remotely configurable settings can be settings that are configurable by a network operator or other technician and/or settings that are configurable by the customer. For example settings that relate to communications between the gateway and the cable network (WAN) may be remotely configurable by a network operator, a customer service representative, or other technician, while settings that relate to communications between the gateway and customer devices (or other LAN devices) may by configurable by the customer or by a customer service representative.

In an embodiment, a gateway comprises a configuration system that can be accessed through the LAN and/or WAN. The configuration system can provide a Hypertext Transfer Protocol (HTTP) interface to modify its remotely configurable settings. HTTP is well suited to providing a graphical user interface and permits a gateway to host instructions to direct the presentation and operation of a graphical user interface in a general purpose web browser on a remote device. However, other communication protocols, for example a telnet or SSH protocol, can also be used to provide a textual command interface or when instructions for a graphical user interface are comprised in a remote device (for example in a configuration application running on the remote device).

In one example, a customer connects a remote device to the gateway by a wired or wireless WAN or LAN connection, and initiates a HTTP connection to the gateway using a web browser on the remote device. In another example, a network operator, technician, or customer service representative may create a connection to the gateway via the WAN or LAN. In another example, a user may open an application on a remote device comprising instructions to cause the remote device to communicate with the gateway using HTTP, telnet, SSH, or anther protocol.

The user can initially be presented with a login dialog requiring administrative credentials before a gateway will establish a configuration session. In one example, the gateway then establishes a configuration session and the user is presented with a graphical user interface that can display and edit one or more pages of data showing current configuration settings, optionally in conjunction with device or network status information, and optionally may present other tools related to the operation of the gateway.

In an embodiment of the disclosure, the gateway can be configured to block any second or subsequent attempt to initiate a configuration session while a first configuration session is open. This can, for example, prevent the gateway from receiving contradictory or inconsistent configuration instructions. The gateway can be configured to close a configuration session and release the block so that a subsequent configuration session can be initiated when the user logs out of the graphical user interface or otherwise intentionally closes the configuration session.

The gateway can also be configured to close a configuration session and release the block on subsequent configuration sessions after the expiration of a first timer so that a session is not held open indefinitely (thereby indefinitely preventing establishment of another configuration session.) The first timer can be set to a period that is sufficiently long that a session will not be closed while a user is entering desired configuration changes, examining data in the graphical user interface, referring to a reference, or is otherwise briefly distracted. In some embodiments, the first timer can be reset each time the gateway receives user initiated input, e.g., by interacting with a graphical user interface. Suitable periods might be from about 60 to 900 seconds, or longer, and the period may be a configurable setting.

The gateway can also be configured to close a configuration session and release the block after the expiration of a second timer that is shorter than the first timer. The remote device can be configured to transmit a regular or irregular heartbeat signal or keep-alive message as long as the configuration interface (for example a HTTP-based web interface or other configuration application) is open and functioning normally. For example, the instructions establishing a HTTP configuration session that are hosted on the gateway and transmitted to the remote device, or instructions comprised in a configuration application comprised on the remote device can cause the remote device to transmit a regular or irregular heartbeat signal or keep-alive message to the gateway. The second timer can be reset each time the gateway receives a heartbeat signal or keep-alive message, and optionally also whenever a user initiated signal is received. The period of the second timer, and corresponding frequency of heartbeat signals or keep-alive messages can be set to a relatively short time, e.g. about 1 to 30 seconds, for example about 10, 15, 20, 25, or 30 seconds. The heartbeat signals or keep-alive messages may simply convey that the configuration interface on the remote device is still functioning, or may include additional data regarding, the time or timing of the message, the status of the remote device, the network, or the configuration interface.

Thus, in one embodiment, a remotely configurable network component can comprise a configuration system operable to establish a configuration session with a remote device, the configuration system comprising a first timer to measure time after a user has initiated transmission of an instruction from a remote device comprising a configuration interface and a second timer to measure time after the configuration interface of the remote device has transmitted a keep alive signal, wherein the configuration system blocks the establishment of a second or subsequent configuration session when a first configuration session is established, and the configuration system closes the first configuration session and stops blocking establishment of a subsequent configuration session if a user has not initiated transmission of an instruction from a remote device within a first period during the configuration session or the configuration interface of the remote device has not transmitted a keep alive signal within a second period during the first configuration session, wherein the first period is preferably longer than the second period, and wherein at least the first timer is reset when the configuration system receives a user initiated instruction during a configuration session and the second timer is reset when the configuration system receives a heartbeat signal from the remote device during a configuration session.

Apparatus for Managing Remote Configuration Settings

Figure 1:
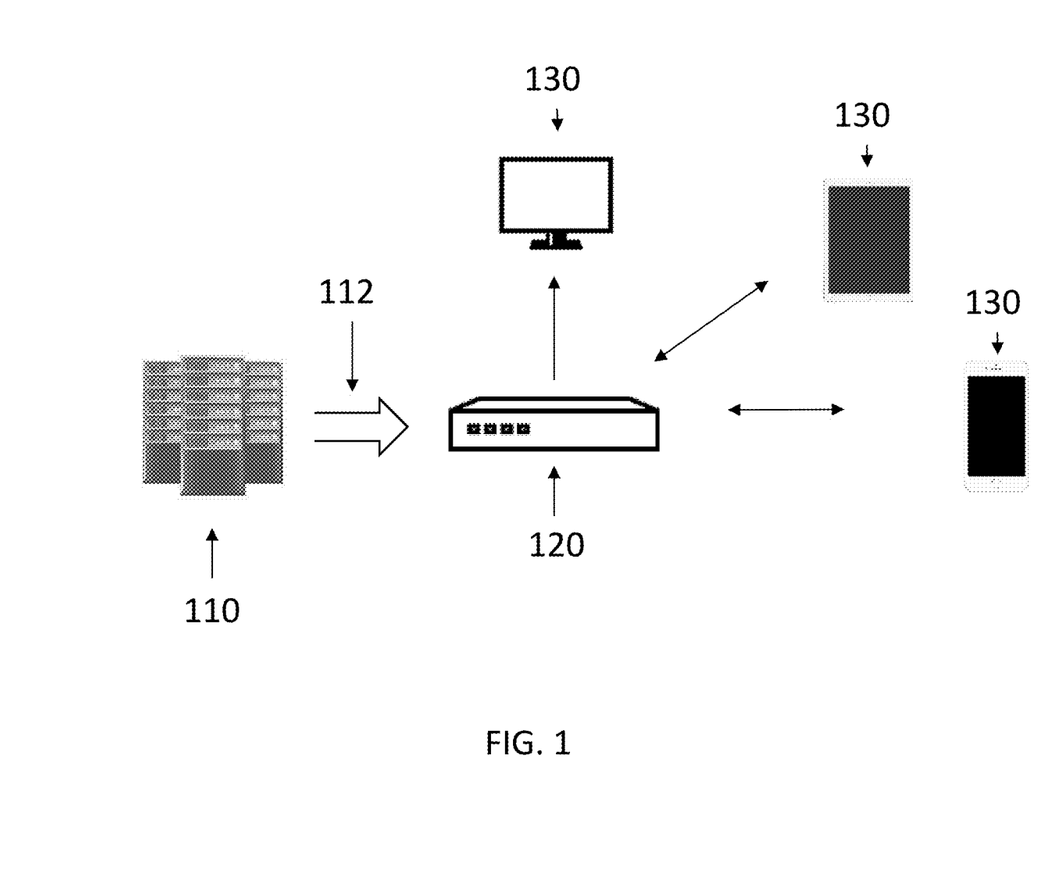
FIG. 1 is an illustration of an exemplary network environment for an embodiment of a method and system for managing remote configuration sessions.

FIG. 1 is a block diagram illustrating an example network environment 100 comprising a remotely configurable network component and remote devices. In embodiments, a cable provider (or MSO) server 110 can communicate with a customer premise equipment (CPE) device such as a gateway 120. The gateway 120 may communicate with one or more customer devices 130 over a local network 114 (for example, a local area network (LAN), a wireless local area network (WLAN), a personal area network (PAN), etc.). The gateway 120 may communicate with an upstream wide area network (WAN) 112 to the cable provider server 110. In accordance with an embodiment, the cable provider server 110 can provide high-bandwidth data transfer, for example, media content, cable television and broadband internet access.

In accordance with an exemplary embodiment, the customer device 130 may be any type of computing device configured to connect via a wired or wireless network, for example, a wireless network utilizing an IEEE 802.11 specification, including a smart phone, a smart TV, a computer, a mobile device, a tablet, or any other device operable to communicate with the gateway 120.

In accordance with an exemplary embodiment, the gateway 120 may communicate with the customer devices 130 over a wired or a wireless connection. A wireless connection between the customer devices 130 and the gateway 120 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

Computer System Architecture

Figure 2:
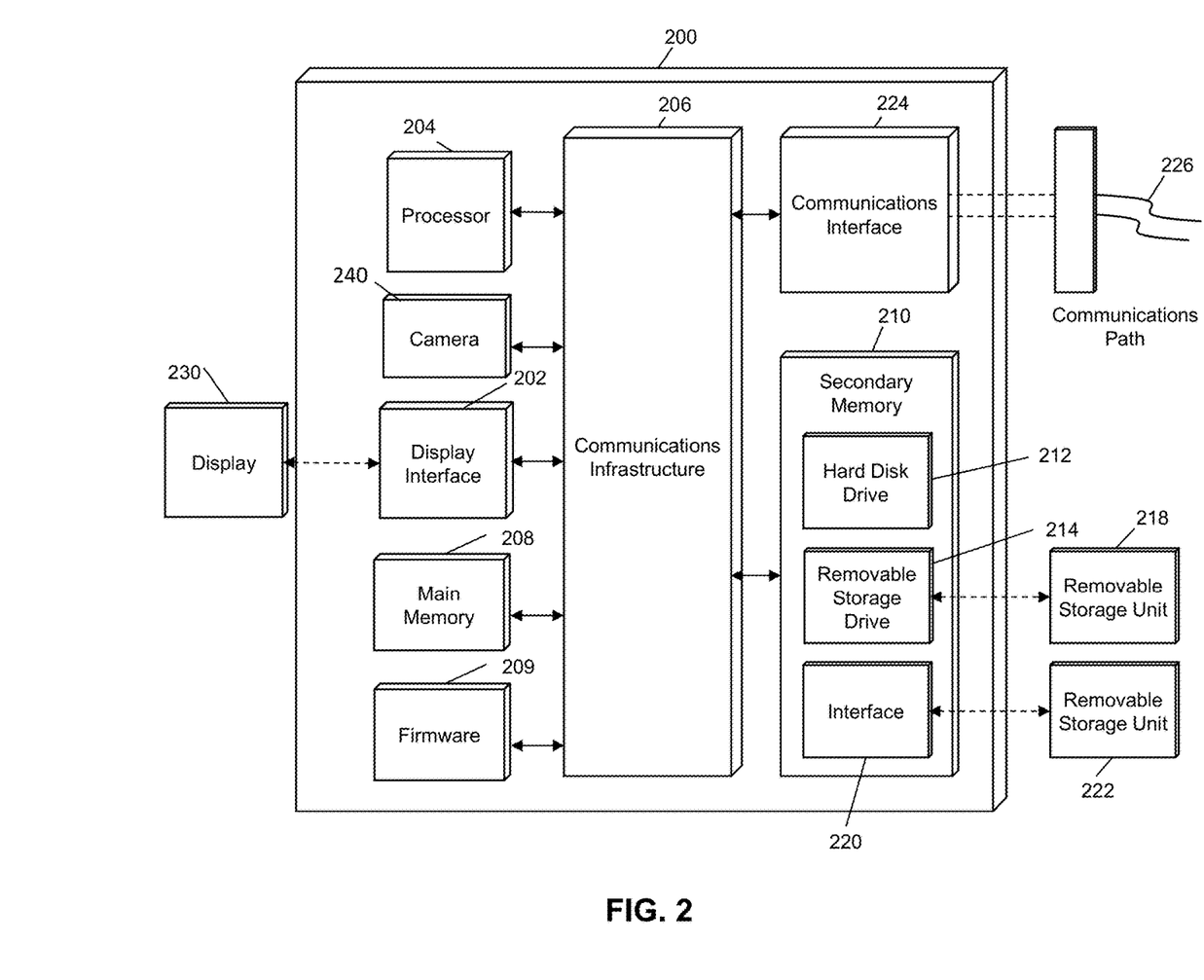
FIG. 2 is an exemplary hardware architecture for an embodiment of a remotely configurable communication device according to an embodiment of the disclosure.

FIG. 2 illustrates a representative computer system 200 in which embodiments of the present disclosure, or portions thereof, may be implemented as computer-readable code executed on hardware. For example, the cable provider server 110, the gateway 120, and the customer device 130 of FIG. 1 may be implemented in whole or in part by a computer system 200 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as removable storage unit 218, removable storage unit 222, and an installed hard disk drive 212, which could be a non-transitory solid-state storage drive or a hard disk in a hard disk drive, and firmware storage 209, such as ROM or EPROM.

Various embodiments of the present disclosure are described in terms of this representative computer system 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 204 may be processor device specifically configured to perform the functions discussed herein. The processor device 204 may be connected to a communications infrastructure 206, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 200 may also include a main memory 208 (e.g., random access memory), firmware storage (e.g., read-only memory (ROM) or EPROM, etc.) and may also include a secondary memory 210. The secondary memory 210 may include the installed storage drive 212 and a removable storage drive 214, such as a floppy disk drive, a magnetic tape drive, an optical disk drive, a flash memory, etc.

The removable storage drive 214 may read from and/or write to the removable storage unit 218 in a well-known manner. The removable storage unit 218 may include a removable storage media that may be read by and written to by the removable storage drive 214. For example, if the removable storage drive 214 is a floppy disk drive or universal serial bus port, the removable storage unit 218 may be a floppy disk or portable flash drive, respectively. In one embodiment, the removable storage unit 218 may be non-transitory computer readable recording media.

In some embodiments, the secondary memory 210 may include alternative means for allowing computer programs or other instructions to be loaded into the computer system 200, for example, the removable storage unit 222 and an interface 220. Examples of such means may include a program cartridge and cartridge interface (e.g., as found in video game systems), a removable memory chip (e.g., EPROM, EEPROM, PROM, etc.) and associated socket, and other removable storage units 222 and interfaces 220 as will be apparent to persons having skill in the relevant art.

Data stored in the computer system 200 (e.g., in the main memory 208, firmware 209, and/or the secondary memory 210) may be stored on any type of suitable computer readable media, such as optical storage (e.g., a compact disc, digital versatile disc, Blu-ray disc, etc.), magnetic storage (e.g., a hard disk drive), or solid state storage. The data may be configured in any type of suitable database configuration, such as a relational database, a structured query language (SQL) database, a distributed database, an object database, etc. Suitable configurations and storage types will be apparent to persons having skill in the relevant art.

The computer system 200 may also include a communications interface 224. The communications interface 224 may be configured to allow software and data to be transferred between the computer system 200 and external devices. Exemplary communications interfaces 224 may include a modem, a network interface (e.g., an Ethernet card), a communications port, a PCMCIA slot and card, etc. Software and data transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using wire, cable, fiber optics, a phone line, a cellular phone link, a radio frequency link, etc.

The computer system 200 may further include a display interface 202. The display interface 202 may be configured to allow data to be transferred between the computer system 200 and external display 230. Exemplary display interfaces 202 may include high-definition multimedia interface (HDMI), digital visual interface (DVI), video graphics array (VGA), etc. The display 230 may be any suitable type of display for displaying data transmitted via the display interface 202 of the computer system 200, including a cathode ray tube (CRT) display, liquid crystal display (LCD), light-emitting diode (LED) display, capacitive touch display, thin-film transistor (TFT) display, etc. The computer may include a camera 240.

Computer program medium and computer usable medium may refer to memories, such as the main memory 208 and secondary memory 210, which may be memory semiconductors (e.g., DRAMs, etc.). These computer program products may be means for providing software to the computer system 200. Computer programs (e.g., computer control logic) may be stored in the main memory 308 and/or the secondary memory 210. Computer programs may also be received via the communications interface 224. Such computer programs, when executed, may enable computer system 200 to implement the present methods as discussed herein. In particular, the computer programs, when executed, may enable processor device 204 to implement the methods illustrated by FIGS. 1, 3, and 4 as discussed herein. Accordingly, such computer programs may represent controllers of the computer system 200. Where the present disclosure is implemented using software executed on hardware, the software may be stored in a computer program product and loaded into the computer system 200 using the removable storage drive 214, interface 220, and hard disk drive 212, or communications interface 224.

The processor device 204 may comprise one or more modules or engines configured to perform the functions of the computer system 200. Each of the modules or engines may be implemented using hardware and, in some instances, may also utilize software executed on hardware, such as corresponding to program code and/or programs stored in the main memory 208 or secondary memory 210. In such instances, program code may be compiled by the processor device 204 (e.g., by a compiling module or engine) prior to execution by the hardware of the computer system 200. For example, the program code may be source code written in a programming language that is translated into a lower level language, such as assembly language or machine code, for execution by the processor device 204 and/or any additional hardware components of the computer system 200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 200 to perform the functions disclosed herein. It will be apparent to persons having skill in the relevant art that such processes result in the computer system 200 being a specially configured computer system 200 uniquely programmed to perform the functions discussed above.

Method for Managing a Remote Configuration Session

Figure 3:
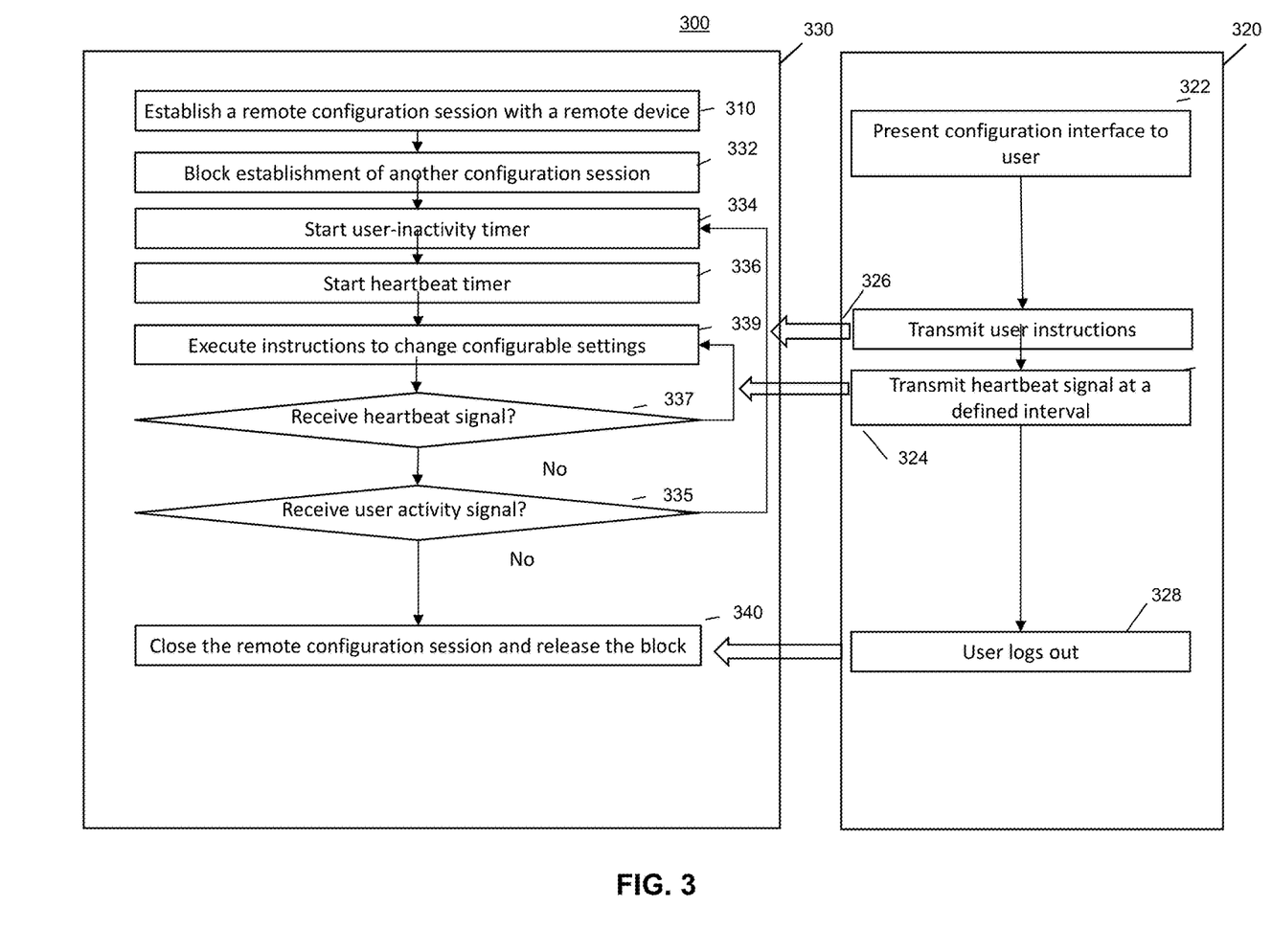
FIG. 3 is a flow chart of a method for managing remote configuration sessions in accordance with an embodiment.

FIG. 3 is a flow chart 300 of an embodiment a method for managing a remote configuration session. As shown in FIG. 3, the method comprises establishment of a configuration session 310 between a remote device 320 and a configuration system on a remotely configurable network component 330. Immediately after a configuration session is established, the configuration system on the remotely configurable network begins blocking 332 the configuration system from establishing any second or subsequent configuration session from another remote device. The configuration system starts two timers, user-inactivity timer (first) 334 and heartbeat timer (second) 336, which can be countdown or count-up timers. The remote device presents a configuration interface 322 to a user and begins periodically sending a heartbeat signal 324 or keep-alive message within a defined interval. If a user interacts with the configuration interface to change a configurable setting, instructions are transmitted 326 to the remotely configurable network component 330.

The first timer 334 is set to measure time to the expiration of a first period. The second timer 336 is set to measure the time to expiration of a second period that is longer than the interval between heartbeat signals or keep-alive messages, but preferably shorter than the first period. If the configuration system receives a user initiated command within the first period, then the first timer 334 resets 337. If the configuration system receives a heartbeat signal or keep-alive message, then the second timer 336 resets 335.

If the user logs out 328 of the configuration session on the remote device 302, and/or either or both of the timers reaches the end of their respective periods without resetting, then the configuration system closes 340 the configuration session and stops blocking the configuration system from establishing any second or subsequent configuration session from another remote device.

Figure 4:
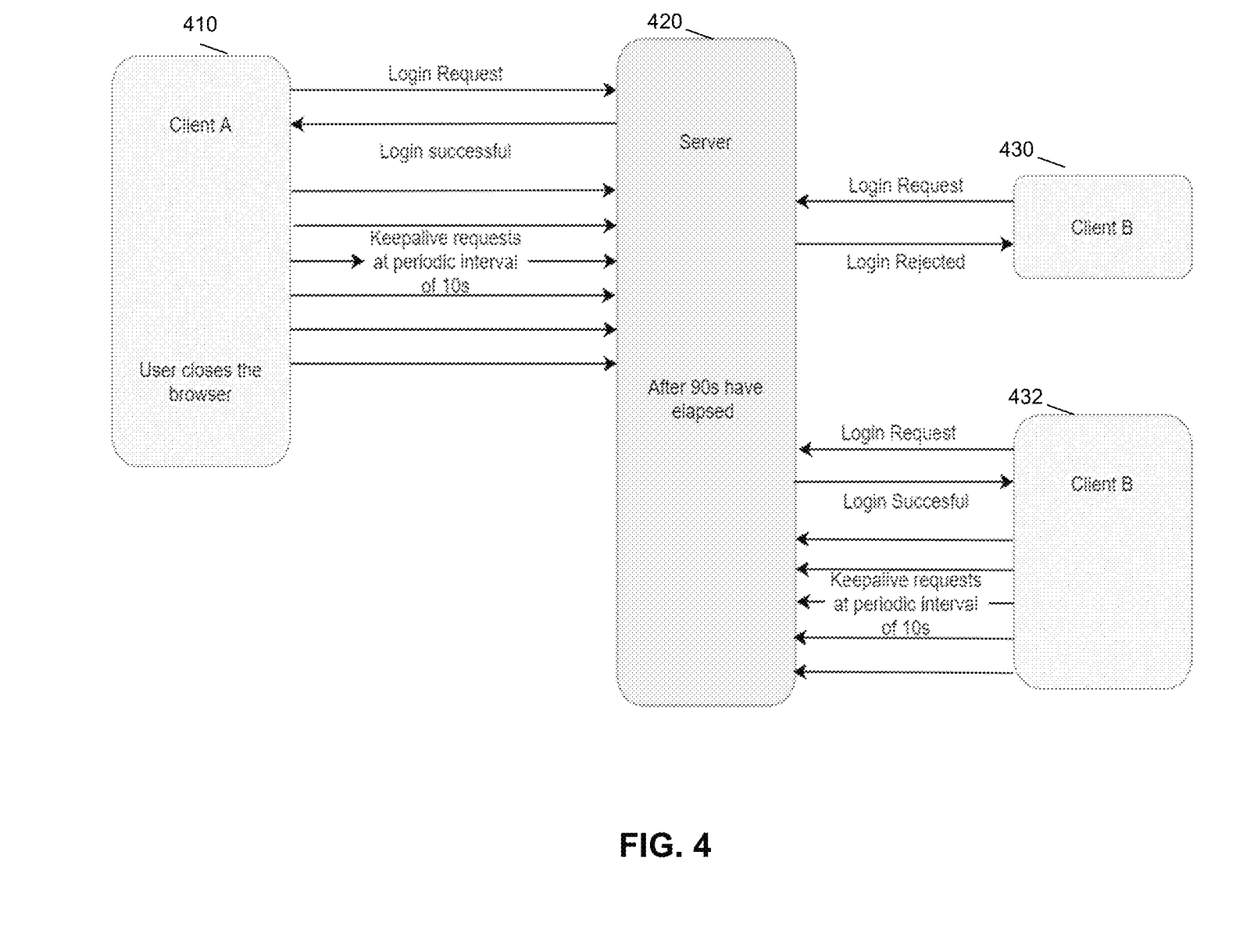
FIG. 4 illustrates an embodiment of a communications flow between a server and clients using a heartbeat signal for session management.
Figure 5:
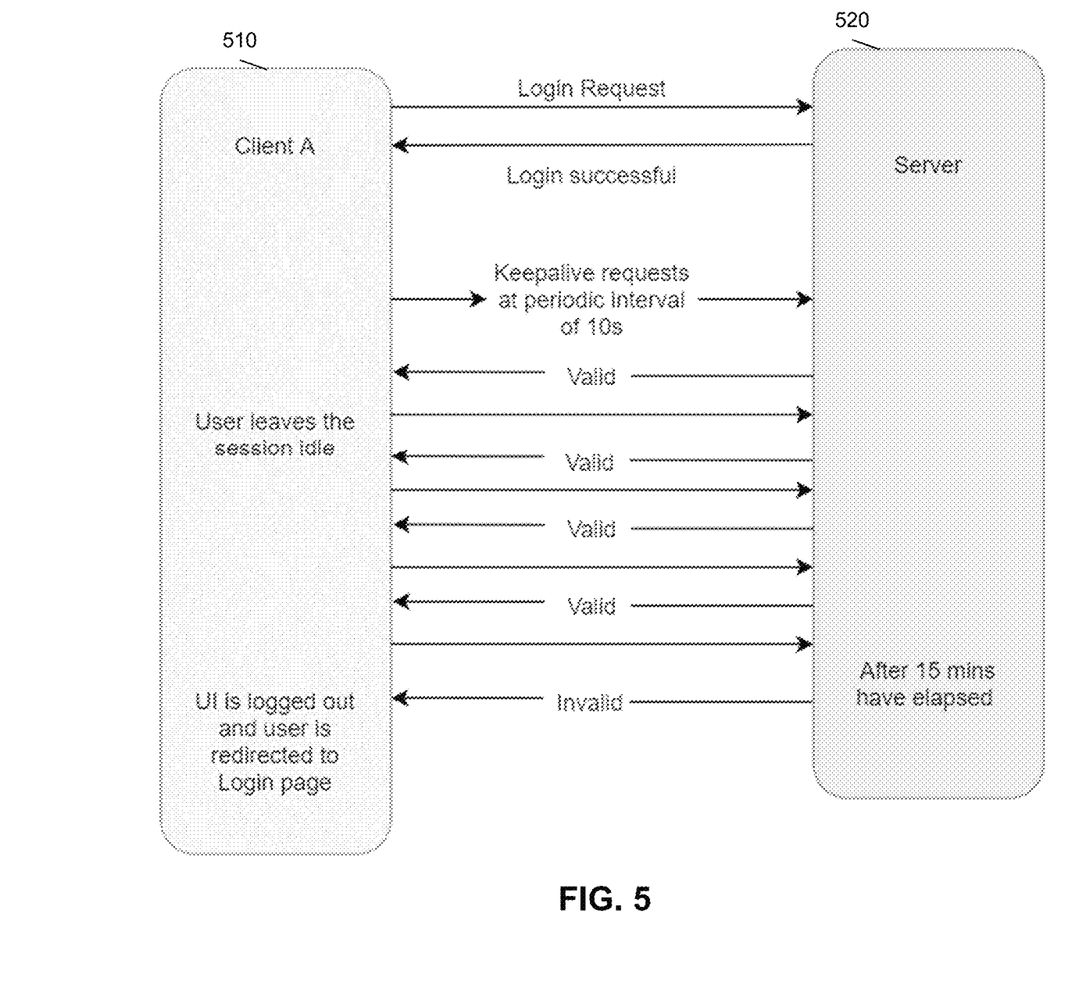
FIG. 5 illustrates another embodiment of a communications flow between a server and client using a heartbeat signal for session management.

FIGS. 4 and 5 illustrate exemplary embodiments of communications flow between a server and clients using a heartbeat signal for session management.

In FIG. 4, Client A 410 transmits a login request to establish a session on server 420, e.g. using a browser. After a successful login, Client A will continue to send a periodic heartbeat signal, e.g., as keepalive requests transmitted at 10 second intervals. While these signals are being received, the session is locked and a login request from Client B 430 will be rejected. If a user closes the browser on Client A without logging out of the session, the heartbeat signal is stopped. After 90 seconds have elapsed, a login request from Client B 432 will be accepted and Client B will begin transmitting a keepalive signal.

In FIG. 5, a circumstance where a user leaves a session idle is illustrated. After a successful login, Client A 510 will continue to send a periodic heartbeat signal, e.g., as keepalive requests transmitted at 10 second intervals. As illustrated, server 520 may respond to each keepalive request with a signal indicating that the keepalive request was valid. While these signals are being received, the session is locked and a login request from another client will be rejected. If a user leaves the session on Client A idle for 15 minutes without logging out of the session, the heartbeat signal continues and the session remains open. However, after 15 minutes have elapsed without user activity, the server may respond to a keep alive request with a signal that the request is invalid. The user is logged out of the session. A login request from another client can now be accepted.

While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for managing a remote configuration session in a remotely configurable network component, the method comprising:
    establishing, by a remotely configurable network component in communication with a remote device, a remote configuration session;
    blocking, by the remotely configurable network component, establishment of a second or subsequent remote configuration session while a first session is established;
    receiving, in the remotely configurable network component, a heartbeat signal transmitted by the remote device, wherein the remote device is configured to transmit a heartbeat signal to the remotely configurable network component while a configuration interface is open and operably connected to a remote configuration session on a remotely configurable network component whether or not a user is interacting with the configuration interface;
    measuring, by a heartbeat timer in the remotely configurable network component, a time since the heartbeat signal was received by the remotely configurable network component;
    restarting, by the remotely configurable network component, the heartbeat timer if the heartbeat signal was received by the remotely configurable network component within a defined heartbeat period;
    closing the remote configuration session, by the remotely configurable network component, if the heartbeat signal was not received by the remotely configurable network component within the defined heartbeat period; and
    unblocking, by the remotely configurable network component, establishment of a second or subsequent remote configuration session when the first session is closed.

2. The method according to claim 1, further comprising:
    measuring, by a user inactivity timer in the remotely configurable network component, a time since a signal of user activity was received from the remote device by the remotely configurable network component;
    restarting, by the remotely configurable network component, the user-inactivity timer if the heartbeat signal was received by the remotely configurable network component within a defined user-inactivity period; and
    closing the remote configuration session, by the remotely configurable network component, if a user initiated signal was not received by the remotely configurable network component within the defined user-inactivity period.

3. The method according to claim 2, wherein the defined heartbeat period is shorter than the defined user-inactivity period.

4. The method according to claim 1, wherein the heartbeat signal is a keep-alive message comprising data relating to the timing of the heartbeat message, a status of the remote device, a status of the network, and/or other data.

5. The method according to claim 1, further comprising:
    changing, on the remotely configurable network component, one or more configurable settings in response to user input to the configuration interface.

6. The method according to claim 1, further comprising:
    closing the remote configuration session, by the remotely configurable network component, if a user logs out of the configuration interface.

7. The method of claim 2, further comprising:
    determining, by the remotely configurable network component, the remote configuration session closed due to one of: a malfunction of the remote configuration session, an interruption of the connection between the remotely configurable network component and the remote device, and an inadvertent closure of the remote configuration session; and
    establishing, by the remotely configurable network component, a second remote configuration session, wherein the second remote configuration session is established before the expiration of the user-inactivity timer of the remote configuration session.

8. An apparatus for managing a remote configuration session comprising:
    a remotely configurable network component in communication with a remote device, the remotely configurable network component configured to:
        establish, with the remote device, a remote configuration session;
        block establishment of a second or subsequent remote configuration session while a first session is established;
        receive a heartbeat signal transmitted by the remote device, wherein the remote device is configured to transmit a heartbeat signal to the remotely configurable network component while a configuration interface is open and operably connected to a remote configuration session on a remotely configurable network component whether or not a user is interacting with the configuration interface;
        measure, by a heartbeat timer in the remotely configurable network component, a time since the heartbeat signal was received by the remotely configurable network component;
        restart the heartbeat timer if the heartbeat signal was received by the remotely configurable network component within a defined heartbeat period;

close the remote configuration session if the heartbeat signal was not received by the remotely configurable network component within the defined heartbeat period; and unblock establishment of a second or subsequent remote configuration session when the first session is closed.

9. The apparatus according to claim 8, wherein the defined heartbeat period is shorter than the defined user-inactivity period.

10. The apparatus according to claim 8, wherein the heartbeat signal is a keep-alive message comprising data relating to the timing of the heartbeat message, a status of the remote device, a status of the network, and/or other data.

11. The apparatus according to claim 8, wherein the remotely configurable network component is configured to close the remote configuration session if a user logs out of the configuration interface.

12. The apparatus according to claim 8, wherein the remotely configurable network component is a customer premises equipment device, a cable modem, a DOCSIS gateway or a router.

13. A non-transitory computer readable medium having instructions operable to cause one or more processors to perform operations comprising:

establishing, by a remotely configurable network component in communication with a remote device, a remote configuration session;

blocking, by a remotely configurable network component, establishment of a second or subsequent remote configuration session while a first session is established;

receiving, in the remotely configurable network component, a heartbeat signal transmitted by the remote device, wherein the remote device is configured to transmit a heartbeat signal to the remotely configurable network component while a configuration interface is open and operably connected to a remote configuration session on a remotely configurable network component whether or not a user is interacting with the configuration interface;

measuring, by a heartbeat timer in the remotely configurable network component, a time since the heartbeat signal was received by the remotely configurable network component;

restarting, by the remotely configurable network component, the timer if the heartbeat signal was received by the remotely configurable network component within a defined heartbeat period;

closing the remote configuration session, by the remotely configurable network component, if the heartbeat signal was not received by the remotely configurable network component within the defined heartbeat period; and unblocking, by the remotely configurable network component, establishment of a second or subsequent remote configuration session when the first session is closed.

14. The non-transitory computer readable medium according to claim 13, wherein the instructions are further operable to cause one or more processors to perform operations comprising:

measuring, by a user inactivity timer in the remotely configurable network component, a time since a signal of user activity was received from the remote device by the remotely configurable network component;

restarting, by the remotely configurable network component, the user-inactivity timer if the heartbeat signal was received by the remotely configurable network component within a defined user-inactivity period; and closing the remote configuration session, by the remotely configurable network component, if a user initiated signal was not received by the remotely configurable network component within the defined user-inactivity period.

15. The non-transitory computer readable medium according to claim 14, wherein the instructions are further operable to cause one or more processors to perform operations wherein the defined heartbeat period is shorter than the defined user-inactivity period.

16. The non-transitory computer readable medium according to claim 13, wherein the instructions are further operable to cause one or more processors to perform operations wherein the heartbeat signal is a keep-alive message comprising data relating to the timing of the heartbeat message, a status of the remote device, a status of the network, and/or other data.

17. The non-transitory computer readable medium according to claim 13, wherein the instructions are further operable to cause one or more processors to perform operations comprising:

changing, on the remotely configurable network component, one or more configurable settings in response to user input to the configuration interface.

18. The non-transitory computer readable medium according to claim 13, wherein the instructions are further operable to cause one or more processors to perform operations comprising:

closing the remote configuration session, by the remotely configurable network component, if a user logs out of the configuration interface.

* * * * *